(12) United States Patent  
Stephens

(10) Patent No.: US 8,625,497 B2  
(45) Date of Patent: Jan. 7, 2014

(54) METHOD, APPARATUS AND SYSTEM TO MANAGE DISTRIBUTED CHANNEL ACCESS WITH TIME RESERVATION

(75) Inventor: Adrian P. Stephens, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 1226 days.

(21) Appl. No.: 10/745,898

(22) Filed: Dec. 24, 2003

(65) Prior Publication Data

US 2005/0147055 A1    Jul. 7, 2005

(51) Int. Cl.
*H04J 3/16* (2006.01)

(52) U.S. Cl.
USPC ............... 370/329; 370/437; 370/468

(58) Field of Classification Search
USPC ......... 370/419, 420, 445, 463, 532, 230, 312, 370/395.4, 443, 468
See application file for complete search history.

(56) References Cited

U.S. PATENT DOCUMENTS

| | | | |
|---|---|---|---|
| 5,787,080 A * | 7/1998 | Hulyalkar et al. | 370/310.2 |
| 6,674,765 B1 * | 1/2004 | Chuah et al. | 370/458 |
| 6,990,120 B1 * | 1/2006 | Lindgren et al. | 370/468 |
| 7,801,092 B2 * | 9/2010 | Meier | 370/338 |
| 2002/0052956 A1 * | 5/2002 | Seibold et al. | 709/225 |
| 2002/0126692 A1 * | 9/2002 | Haartsen | 370/450 |
| 2003/0179734 A1 * | 9/2003 | Tsutsumi et al. | 370/338 |
| 2005/0030894 A1 | 2/2005 | Stephens | |
| 2005/0068895 A1 | 3/2005 | Stephens | |
| 2005/0078707 A1 | 4/2005 | Maltsev | |
| 2005/0135295 A1 * | 6/2005 | Walton et al. | 370/328 |
| 2005/0143081 A1 | 6/2005 | Stephens | |
| 2006/0029073 A1 * | 2/2006 | Cervello et al. | 370/389 |

OTHER PUBLICATIONS

U.S. Appl. No. 10/637,335, filed Aug. 8, 2003.

* cited by examiner

*Primary Examiner* — Ian N Moore
*Assistant Examiner* — Mon Cheri Davenport
(74) *Attorney, Agent, or Firm* — Schwegman, Lundberg & Woessner, P.A.

(57) ABSTRACT

A method, apparatus and system to manage distributed channel access with time reservation are generally presented. In this regard, a reservation agent is introduced to reserve access to a wireless network channel for an amount of time greater than necessary to transmit to another station(s) and to transmit to the other station(s).

18 Claims, 2 Drawing Sheets

METHOD, APPARATUS AND SYSTEM TO MANAGE DISTRIBUTED CHANNEL ACCESS WITH TIME RESERVATION

FIELD OF THE INVENTION

Embodiments of the present invention generally relate to the field of wireless networking, and, more particularly to a method, apparatus and system to manage distributed channel access with time reservation.

BACKGROUND OF THE INVENTION

With an increasing number of wireless network standards and devices there is a greater need to utilize and share channels efficiently and fairly.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention are generally directed to a method, apparatus and system to manage distributed channel access with time reservation. In this regard, in accordance with but one example implementation of the broader teachings of the present invention, a reservation agent is introduced. In accordance with but one example embodiment, the reservation agent employs an innovative method to reserve an overestimated amount of time to transmit and then to release any unused time reserved. The reservation may not know the precise duration of the transmission a priori because it may not know the transmit rate, it may not know the amount of data to be sent, or it may not know how many retransmissions will be required. According to one example method, the reservation agent may broadcast a frame that will inhibit other devices in the network from attempting to broadcast for a specified amount of time and then may broadcast a frame to release any used portion of the time reservation, as described hereinafter.

In the following description, for purposes of explanation, numerous specific details are set forth in order to provide a thorough understanding of the invention. It will be apparent, however, to one skilled in the art that embodiments of the invention can be practiced without these specific details. In other instances, structures and devices are shown in block diagram form in order to avoid obscuring the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
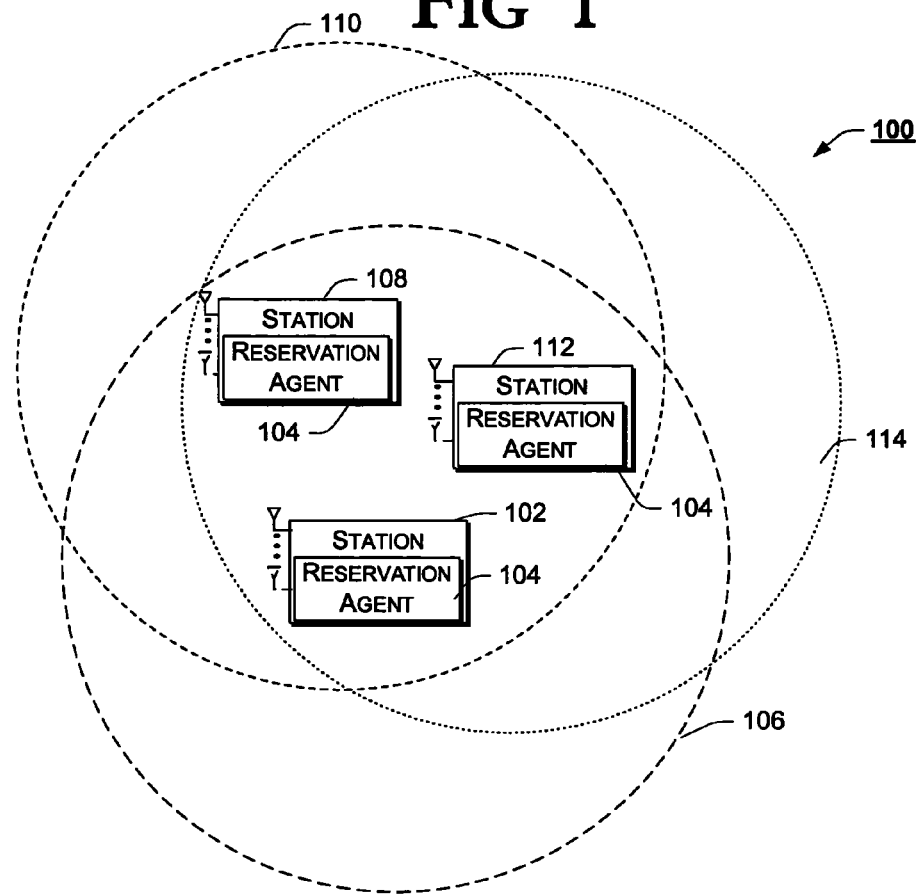
FIG. 1 is a block diagram of an example network environment suitable for implementing the reservation agent, in accordance with one example embodiment of the invention.

FIG. 1 is a block diagram of an example network environment suitable for implementing the reservation agent, in accordance with one example embodiment of the invention. In accordance with the illustrated example embodiment, network environment 100 may include one or more of stations 102, 108 and 112, reservation agent 104, and network areas 106, 110 and 114 coupled as shown in FIG. 1. Reservation agent 104, as described more fully hereinafter, may well be used in electronic appliances and network environments of greater or lesser complexity than that depicted in FIG. 1. Also, the innovative attributes of reservation agent 104 as described more fully hereinafter may well be embodied in any combination of hardware and software.

Stations 102, 108 and 112 may represent laptop, desktop, or handheld computing devices or any other computing devices or appliances that can access network resources through a wireless network and that host reservation agent 104. As used herein, a wireless network generally represents any network wherein communications do not require the use of wires or cables. Examples of wireless networks include, but are not limited to, wireless local area networks (WLAN), wireless metropolitan area networks (WMAN), wireless wide are networks (WWAN), and wireless personal area networks (WPAN). In one embodiment, though the present invention is not so limited, stations 102, 108 and 112 may represent The Institute of Electrical and Electronics Engineers, Inc. (IEEE) 802.11n (amendment to 802.11 standard, under development) compliant stations.

Network areas 106, 110 and 114 may represent the maximum signal ranges for stations 102, 108 and 112, respectively. Though depicted as two-dimensional circles for illustration purposes, network areas 106, 110 and 114 may be three-dimensional and may be any shape based on obstructions, terrain, and other factors. In one embodiment, stations 102, 108 and 112 may be located such that each can communicate with the others, thereby creating a network with shared channel access.

Reservation agent 104 may have an architecture as described in greater detail with reference to FIG. 2. Reservation agent 104 may also perform one or more methods for managing channel access with a time reservation, such as the method described in greater detail with reference to FIG. 3.

Figure 2:
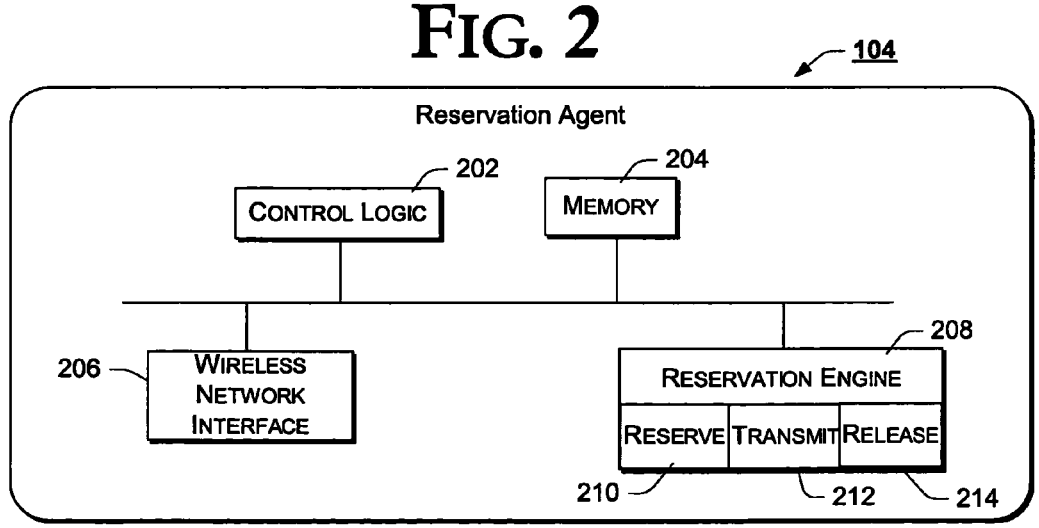
FIG. 2 is a block diagram of an example reservation agent architecture, in accordance with one example embodiment of the invention.

FIG. 2 is a block diagram of an example reservation agent architecture, in accordance with one example embodiment of the invention. As shown, reservation agent 104 may include one or more of control logic 202, memory 204, wireless network interface 206, and reservation engine 208 coupled as shown in FIG. 2. In accordance with one aspect of the present invention, to be developed more fully below, reservation agent 104 may include a reservation engine 208 comprising one or more of reserve services 210, transmit services 212, and/or release services 214. It is to be appreciated that, although depicted as a number of disparate functional blocks, one or more of elements 202-214 may well be combined into one or more multi-functional blocks. Similarly, reservation engine 208 may well be practiced with fewer functional blocks, i.e., with only transmit services 212, without deviating from the spirit and scope of the present invention, and may well be implemented in hardware, software, firmware, or any combination thereof. In this regard, reservation agent 104 in general, and reservation engine 208 in particular, are merely illustrative of one example implementation of one aspect of the present invention. As used herein, reservation agent 104 may well be embodied in hardware, software, firmware and/or any combination thereof.

As introduced above, reservation agent 104 may have the ability to reserve channel access for longer than necessary to transmit and then to release any excess time reservation when finished transmitting. In one embodiment, reservation agent 104 may overestimate the amount of time needed to transmit based on the size of the communication to be transmitted. In the same and other embodiments, reservation agent 104 may reserve a predefined maximum amount of time to transmit. One skilled in the art would appreciate that reservation agent 104 can provide for efficient use of a network channel by minimizing collisions between communications of network devices and minimizing unused channel access.

As used herein control logic 202 provides the logical interface between reservation agent 104 and its host station (for example 102). In this regard, control logic 202 may manage one or more aspects of reservation agent 104 to provide a communication interface from station 102 to wireless network communications, e.g., through wireless interface 206 and one or more antenna(e).

According to one aspect of the present invention, though the claims are not so limited, control logic 202 may receive event indications such as, e.g., receipt from the host station of a communication to be transmitted. Upon receiving such an indication, control logic 202 may selectively invoke the resource(s) of reservation engine 208. As part of an example method for managing distributed channel access with time reservation, as explained in greater detail with reference to FIG. 3, control logic 202 may selectively invoke reserve services 210 or release services 214 that may reserve or release channel access, respectively. Control logic 202 also may selectively invoke transmit services 212, as explained in greater detail with reference to FIG. 3, to transmit to one or more other station(s). As used herein, control logic 202 is intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like. In some implementations, control logic 202 is intended to represent content (e.g., software instructions, etc.), which when executed implements the features of control logic 202 described herein.

Memory 204 is intended to represent any of a wide variety of memory devices and/or systems known in the art. According to one example implementation, though the claims are not so limited, memory 204 may well include volatile and non-volatile memory elements, possibly random access memory (RAM) and/or read only memory (ROM). Memory 204 may be used to store communication(s) to be transmitted and/or a network allocation vector (NAV), which may indicate if the network channel is reserved and for how long.

Wireless network interface 206 provides a path through which reservation agent 104 can communicate with other network devices, for example among stations 102, 108 and 112. Wireless network interface 206 is intended to represent any of a wide variety of network interfaces and/or controllers known in the art.

As introduced above, reservation engine 208 may be selectively invoked by control logic 202 to reserve an overestimated amount of time to transmit the communication(s), to transmit the communication(s), and to release any excess time reservation no longer needed. In accordance with the illustrated example implementation of FIG. 2, reservation engine 208 is depicted comprising one or more of reserve services 210, transmit services 212 and release services 214. Although depicted as a number of disparate elements, those skilled in the art will appreciate that one or more elements 210-214 of reservation engine 208 may well be combined without deviating from the scope and spirit of the present invention.

Reserve services 210, as introduced above, may provide reservation agent 104 with the ability to reserve an overestimated amount of time to transmit a communication(s). In one example embodiment, reserve services 210 may generate a frame to be transmitted that when received by other stations in the wireless network, causes the other stations to not transmit on the network channel for a specified amount of time. Reserve services 210 may also respond to the receipt of such frames by setting a medium reservation timer (referred to here as NAV) to keep from transmitting on the network channel for a specified amount of time. In one example embodiment, the amount of time to reserve may based on the size of the communication(s) and an underestimate of the rate of transfer that can be achieved. Although the present invention is not so limited, the overestimated time reservation may be a maximum available time reservation. Other methods of overestimating the amount of time to reserve that do not deviate from the scope of the present invention will occur to those skilled in the art.

As introduced above, transmit services 212 may provide reservation agent 104 with the ability to transmit the communication(s). Transmit services 212 may first verify that a NAV is not active indicating that another station has reserved the network channel. In one embodiment, transmit services 212 may include error correction capabilities to ensure that each frame was properly transmitted and received. In one example embodiment, transmit services 212 may retransmit frames that were not properly received.

Release services 214, as introduced above, may provide reservation agent 104 with the ability to release any excess time reservation after the communication(s) have been transmitted. In one embodiment, release services 214 may generate a frame to be transmitted that when received by other stations in the wireless network, causes the other stations to transmit at will on the network channel. Reserve services 210 may also respond to the receipt of such frames by clearing a NAV that had kept the station from transmitting on the network channel. In one example embodiment, release services 214 may use a quality of service (QoS) frame as defined in The Institute of Electrical and Electronics Engineers, Inc. (IEEE) 802.11e (amendment to 802.11 standard, under development), for example a QoS-Null frame with a zero duration value addressed to the broadcast address may be interpreted as an indication to clear the NAV. In another example embodiment, release services may use another frame that is understood by the network stations.

Figure 3:
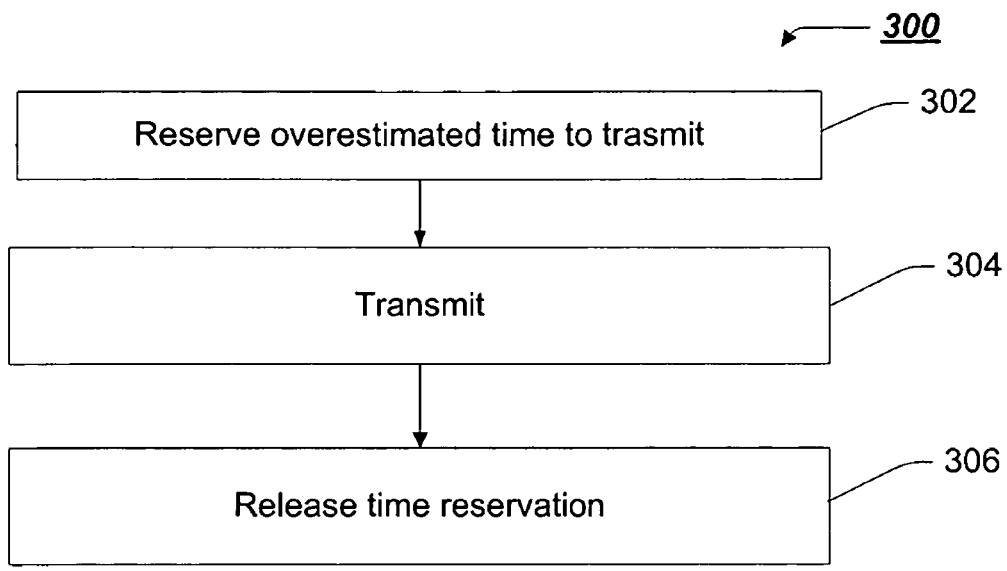
FIG. 3 is a flow chart of an example method for managing distributed channel access with time reservation, in accordance with one example embodiment of the invention.

FIG. 3 is a flow chart of an example method for managing distributed channel access with time reservation, in accordance with one example embodiment of the invention. It will be readily apparent to those of ordinary skill in the art that although the following operations may be described as a sequential process, many of the operations may in fact be performed in parallel or concurrently. In addition, the order of the operations may be re-arranged without departing from the spirit of embodiments of the invention.

According to but one example implementation, the method of FIG. 3 begins with control logic 202 invoking reserve services 210 to reserve (302) an overestimated time reservation. In one example embodiment, reserve services 210 of station 102 may generate a frame that is transmitted by transmit services 212 (provided, there is no NAV restriction) through wireless network interface 206 to stations 108 and 112. In one example embodiment, stations 108 and 112 receive the frame from station 102 and set a NAV that gives station 102 use of the network channel for a specified amount of time that from the point of view of station 102 is an overestimate of the amount of time actually needed.

Next, transmit services 212 may be invoked to transmit (304). In one example embodiment, transmit services 212 of station 102 may broadcast (and rebroadcast if necessary) frames to station 108 and/or station 112 for as long as a time reservation is active.

Control logic 202 may then release (306) the time reservation by invoking release services 214. In one example embodiment, when transmit services 212 no longer needs a time reservation of the network channel (for example, when finished transmitting a communication), release services 214 of station 102 may generate a frame that is transmitted through wireless network interface 206 to stations 108 and 112. In one example embodiment, stations 108 and 112 receive the frame from station 102 and clear a NAV, thereby freeing up access to the network channel.

Figure 4:
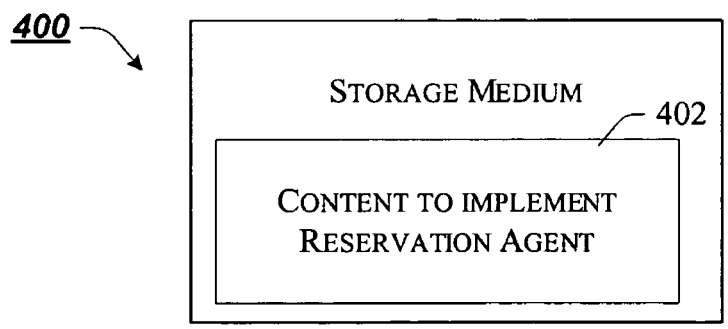
FIG. 4 is a block diagram of an example article of manufacture including content which, when accessed by a device, causes the device to implement one or more aspects of one or more embodiment(s) of the invention.

FIG. 4 illustrates a block diagram of an example storage medium comprising content which, when accessed, causes an electronic appliance to implement one or more aspects of the reservation agent 104 and/or associated method 300. In this regard, storage medium 400 includes content 402 (e.g., instructions, data, or any combination thereof) which, when executed, causes the appliance to implement one or more aspects of reservation agent 104, described above.

The machine-readable (storage) medium 400 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem, radio or network connection).

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the present invention may be used in a variety of applications. Although the present invention is not limited in this respect, the invention disclosed herein may be used in microcontrollers, general-purpose microprocessors, Digital Signal Processors (DSPs), Reduced Instruction-Set Computing (RISC), Complex Instruction-Set Computing (CISC), among other electronic components. However, it should be understood that the scope of the present invention is not limited to these examples.

Embodiments of the present invention may also be included in integrated circuit blocks referred to as core memory, cache memory, or other types of memory that store electronic instructions to be executed by the microprocessor or store data that may be used in arithmetic operations. In general, an embodiment using multistage domino logic in accordance with the claimed subject matter may provide a benefit to microprocessors, and in particular, may be incorporated into an address decoder for a memory device. Note that the embodiments may be integrated into radio systems or hand-held portable devices, especially when devices depend on reduced power consumption. Thus, laptop computers, cellular radiotelephone communication systems, two-way radio communication systems, one-way pagers, two-way pagers, personal communication systems (PCS), personal digital assistants (PDA's), cameras and other products are intended to be included within the scope of the present invention.

The present invention includes various operations. The operations of the present invention may be performed by hardware components, or may be embodied in machine-executable content (e.g., instructions), which may be used to cause a general-purpose or special-purpose processor or logic circuits programmed with the instructions to perform the operations. Alternatively, the operations may be performed by a combination of hardware and software. Moreover, although the invention has been described in the context of a computing appliance, those skilled in the art will appreciate that such functionality may well be embodied in any of number of alternate embodiments such as, for example, integrated within a communication appliance (e.g., a cellular telephone).

Many of the methods are described in their most basic form but operations can be added to or deleted from any of the methods and information can be added or subtracted from any of the described messages without departing from the basic scope of the present invention. Any number of variations of the inventive concept is anticipated within the scope and spirit of the present invention. In this regard, the particular illustrated example embodiments are not provided to limit the invention but merely to illustrate it. Thus, the scope of the present invention is not to be determined by the specific examples provided above but only by the plain language of the following claims.

What is claimed is:

1. A wireless communication station (STA) arranged to operate in a network in accordance with an IEEE 802.11 standard in which channel access is distributed and controlled by network allocation vectors (NAVs), the wireless communication station comprising a wireless network interface arranged to:

transmit an initial frame to reserve a wireless channel for a duration indicated in the initial frame;

transmit data frames to one or more other wireless communication stations during the duration of the reservation;

transmit an end frame within the duration after receipt of an acknowledgement of the data frames, the end frame configured to release any unused excess time of the reservation that is remaining after transmission of the end frame, the end frame being transmitted only when sufficient time within the reservation remains; and refrain from transmitting the end frame when insufficient time for transmission of the end frame within the reservation remains after transmission of the data frames, wherein the wireless network interface is to transmit the initial frame when a NAV of the wireless communication station is not active and is to refrain from transmitting the initial frame when the NAV of the wireless communication station is active, wherein the initial frame is configured to set a NAV of the one or more other communication stations that receive the initial frame, wherein the end frame is arranged to release the NAV of the one or more other communication stations and allow the one or more other communication stations to begin contention-based channel access, and wherein when a time needed for the transmission of the data frames exceeds the duration of the reservation, the wireless network interface is further arranged to limit transmission of the data frames to the duration of the reservation.

2. A wireless communication station (STA) arranged to operate in a network in accordance with an IEEE 802.11 standard in which channel access is distributed and controlled by network allocation vectors (NAVs), the wireless communication station comprising a wireless network interface arranged to:
 transmit an initial frame to reserve a wireless channel for a duration indicated in the initial frame;
 transmit data frames to one or more other wireless communication stations during the duration of the reservation;
 transmit an end frame within the duration after receipt of an acknowledgement of the data frames, the end frame configured to release any unused excess time of the reservation that is remaining after transmission of the end frame, the end frame being transmitted only when sufficient time within the reservation remains; and
 refrain from transmitting the end frame when insufficient time for transmission of the end frame within the reservation remains after transmission of the data frames,
 wherein the wireless network interface is to transmit the initial frame when a NAV of the wireless communication station is not active and is to refrain from transmitting the initial frame when the NAV of the wireless communication station is active,
 wherein the initial frame is configured to set a NAV of the one or more other communication stations that receive the initial frame,
 wherein the end frame is arranged to release the NAV of the one or more other communication stations and allow the one or more other communication stations to begin contention-based channel access,
 wherein the wireless communication device further comprises a reservation agent to estimate the duration of the reservation to be at least as great as a time needed for transmission of the data frames up to a maximum available reservation.

3. The wireless communication station of claim 1 further comprising a reservation agent to overestimate the time needed for transmission of the data frames to compensate for one or more of a transmission rate and retransmissions.

4. The wireless communication station of claim 1 wherein the duration is a duration of a maximum available reservation.

5. The wireless communication station of claim 1 further comprising a reservation agent to estimate the duration of the reservation, and
 wherein when an unknown amount of data is to be transmitted, the reservation agent is to determine the duration to be a duration of a maximum available reservation.

6. The wireless communication station of claim 1 wherein the wireless network interface is arranged to transmit the data frames to one or more other communication stations for as long as the reservation is active.

7. The wireless communication station of claim 1 wherein the end frame is a QoS null frame with a zero duration value.

8. The wireless communication station of claim 1 wherein the end frame is contention-free end frame.

9. The wireless communication station of claim 1 wherein prior to transmission of the initial frame, the station is arranged to perform an Enhanced Distributed Channel Access (EDCA) channel access process in accordance with one of the IEEE 802.11n or 802.11e standards.

10. The wireless communication station of claim 1 wherein the initial frame is a first frame of a transmission opportunity.

11. A wireless communication station (STA) arranged to operate in a network in which channel access is distributed and controlled by network allocation vectors (NAVs), the wireless communication station comprising:
 a reservation agent to estimate a duration of a reservation; and
 a wireless network interface arranged to:
 transmit an initial frame to reserve a wireless channel for the duration indicated in the initial frame when a NAV of the wireless communication station is not active;
 transmit at least some data frames to one or more other wireless communication stations during the duration of the reservation;
 transmit an end frame within the duration after receipt of an acknowledgment of the data frames when sufficient time for transmission of the end frame within the reservation remains frame after transmission of the data frames, the end frame configured to release any unused excess time of the reservation that is remaining after transmission of the end frame; and
 refrain from transmitting the end frame when insufficient time for transmission of the end frame within the reservation remains after transmission of the data frames,
 wherein the wireless network interface is to transmit the initial frame when a NAV of the wireless communication station is not active and is to refrain from transmitting the initial frame when the NAV of the wireless communication station is active,
 wherein the initial frame is configured to set a NAV of the one or more other communication stations that receive the initial frame,
 wherein the end frame is arranged to release the NAV of the one or more other communication stations and allow the one or more other communication stations to begin contention-based channel access, and
 wherein when a time needed for the transmission of the data frames exceeds the duration of the reservation, the wireless network interface is further arranged to limit transmission of the data frames to the duration of the reservation.

12. The wireless communication station of claim 11 wherein the reservation agent is further arranged to overestimate the time needed for transmission of the data frames to compensate for one or more of a transmission rate and retransmissions.

13. The wireless communication station of claim 11 wherein the duration is a duration of a maximum available reservation.

14. A method performed by a wireless communication station (STA) arranged to operate in a network in accordance with an IEEE 802.11 standard in which channel access is distributed and controlled by network allocation vectors (NAVs), the method comprising:
 transmitting an initial frame to reserve a wireless channel for a duration indicated in the initial frame;
 transmitting data frames to one or more other wireless communication stations during the duration of the reservation; and
 transmitting an end frame within the duration after receipt of acknowledgements of the data frames when sufficient time for transmission of the end frame within the reservation remains, the end frame configured to release any unused excess time of the reservation that is remaining after transmission of the end frame, the end frame being transmitted only when sufficient time within the reservation remains, wherein the initial frame is transmitted when a NAV of the wireless communication station is not active and is not transmitted when the NAV of the wireless communication station is active, wherein the initial frame is configured to set a NAV of the one or more other communication stations that receive the initial frame, wherein the end frame is arranged to release the NAV of the one or more other communication stations and allow the one or more other communication stations to begin contention-based channel access, and wherein when a time needed for the transmission of the data frames exceeds the duration of the reservation, transmission of the data frames is limited to the duration of the reservation.

15. The method of claim 14 further comprising:
refraining from transmitting the end frame when insufficient time for transmission of the end frame within the reservation remains after transmission of the data frames; and
overestimating the time needed for transmission of the data frames to compensate for one or more of a transmission rate and retransmissions.

16. The method of claim 14 wherein the duration is a duration of a maximum available reservation.

17. A wireless communication station (STA) arranged to operate in a network in accordance with an IEEE 802.11 standard in which channel access is distributed and controlled by network allocation vectors (NAVs), the wireless communication station comprising a wireless network interface arranged to:

transmit an initial frame to reserve a wireless channel for the duration, the duration indicated in the initial frame and being in excess of a time needed for transmission of data frames; and transmit an end frame within the duration after receipt of an acknowledgement of data frames only when sufficient time for transmission of the end frame within the reservation remains, the end frame configured to release any unused excess time of the reservation that is remaining after transmission of the end frame; and refrain from transmitting the end frame when insufficient time for transmission of the end frame within the reservation remains after transmission of the data frames, wherein the wireless network interface is to transmit the initial frame when a NAV of the wireless communication station is not active and is to refrain from transmitting the initial frame when the NAV of the wireless communication station is active, wherein the initial frame is configured to set a NAV of the one or more other communication stations that receive the initial frame, wherein the end frame is arranged to release the NAV of the one or more other communication stations and allow the one or more other communication stations to begin contention-based channel access, and wherein the wireless communication device further comprises a reservation agent to estimate the duration of the reservation to be at least as great as a time needed for transmission of the data frames up to a maximum available reservation.

18. The wireless communication station of claim 17 wherein the duration is a duration of a maximum available reservation.

* * * * *